(12) United States Patent
Wang

(10) Patent No.: US 11,889,952 B1
(45) Date of Patent: Feb. 6, 2024

(54) COFFEE GRINDER WITH FOLDING-TYPE HANDLE

(71) Applicant: Ningbo Tier Outdoor Technology Co., Ltd., Ningbo (CN)

(72) Inventor: Anzhi Wang, Ningbo (CN)

(73) Assignee: Ningbo Tier Outdoor Technology Co., Ltd., Ningbo (CN)

( * ) Notice: Subject to any disclaimer, the term of this patent is extended or adjusted under 35 U.S.C. 154(b) by 0 days.

(21) Appl. No.: 17/895,058

(22) Filed: Aug. 25, 2022

(30) Foreign Application Priority Data

Jul. 28, 2022 (CN) .......................... 202221970100.3

(51) Int. Cl.
*A47J 42/34* (2006.01)
*A47J 42/40* (2006.01)

(52) U.S. Cl.
CPC ............... *A47J 42/34* (2013.01); *A47J 42/40* (2013.01)

(58) Field of Classification Search
CPC .. A47J 42/04; A47J 42/24; A47J 42/34; A47J 42/40; A47J 42/46
See application file for complete search history.

(56) References Cited

U.S. PATENT DOCUMENTS

2017/0332831 A1* 11/2017 Lee .................... A47G 19/2205
2022/0007893 A1* 1/2022 Weimer .................. A47J 42/40

FOREIGN PATENT DOCUMENTS

WO   WO-2021118172 A1 * 6/2021 .............. A47J 42/04

OTHER PUBLICATIONS

English translate (WO2021118172A1), retrieved date Jun. 24, 2023.*

* cited by examiner

*Primary Examiner* — Matthew Katcoff
*Assistant Examiner* — Mohammed S. Alawadi
(74) *Attorney, Agent, or Firm* — Zhigang Ma

(57) ABSTRACT

A coffee grinder with folding-type handle belongs to the field of coffee grinding technology and includes a grinder body and a handle. A top of the grinder body is disposed with a top cover, the top cover is disposed with a supporting frame, and a side of the supporting frame is disposed with a sliding slot. The top cover is further disposed with a sliding bar, one end of the sliding bar is connected to the sliding slot through a pin shaft, and the other end of the sliding bar is connected to the handle. The coffee grinder with folding-type handle has strong practicability, the handle of the grinder can be folded, and it is more convenient to carry and more flexible to use.

8 Claims, 4 Drawing Sheets

COFFEE GRINDER WITH FOLDING-TYPE HANDLE

TECHNICAL FIELD

The disclosure relates to the field of coffee grinding technologies, and more particularly to a coffee grinder with folding-type handle.

BACKGROUND

Grinding coffee is a traditional method for coffee brewing. After coffee beans are ground into coffee powder, some volatile substances in the coffee powder will be lost to the surrounding environment during a storage period. Meanwhile, the coffee powder will also be oxidized due to excessive contact with air, and thus fragrance oil and aroma of the coffee powder will be lost, which will make the taste worse. Therefore, the coffee beans need to be temporarily ground before brewing to preserve the flavor of the coffee.

A hand-cranked coffee grinder is a tool for grinding coffee beans into coffee powder. The hand-cranked coffee grinder includes an outer grinding disc and a grinding core arranged in the outer grinding disc. The grinding core is connected to a rotating handle, and the rotating handle is rotated to drive the grinding core to rotate so as to grind the coffee beans. In order to improve portability, the hand-cranked coffee grinder is usually designed to be miniaturized as a whole. However, after miniaturization, the rotating handle is also shortened, according to a lever principle, the force to rotate the rotating handle needs to be increased, and an excessively small rotating radius also causes some troubles to an operator, thus degrading the use experience.

The hand-cranked coffee grinder of the related art is inconvenient to use due to the shortened rotating handle, and therefore, a hand-cranked coffee grinder with a foldable handle which is more convenient to use is desired.

SUMMARY

In view of the shortcomings of the related art, a main purpose of the disclosure is to provide a coffee grinder with folding-type handle, which has strong practicability, can fold the handle, is more convenient to carry and is more flexible to use.

In order to achieve the above purpose of the disclosure, an embodiment of the disclosure proposes a coffee grinder with folding-type handle, including a grinder body and a handle. A top of the grinder body is disposed with a top cover, the top cover is disposed with a supporting frame, and a side of the supporting frame is disposed with a first sliding slot. The top cover is further disposed with a sliding bar, an end of the sliding bar is connected to the first sliding slot through a pin shaft, and a second end of the sliding bar is connected to the handle.

In an embodiment, the handle is disposed with a rotor and a rotating shaft, a bottom of the handle is connected to a top of the rotor, a bottom of the rotor is connected to the rotating shaft, and the handle is connected to the second end of the sliding bar through the rotating shaft.

In an embodiment, a top end of the supporting frame is disposed with a protrusion, the sliding bar includes a through-groove, and the protrusion is configured (i.e., structured and arranged) to be engaged in the through-groove.

In an embodiment, the top cover is disposed with a first groove, the first groove is disposed with an inner hex nut, and the inner hex nut is disposed with a second groove. The grinder body includes a central shaft, a first end of the central shaft is connected to the top cover through the first groove.

In an embodiment, the grinder body includes a grinding housing, a grinding inner chamber, and a coffee powder container. The grinding inner chamber is arranged inside the grinding housing, the coffee powder container is arranged at a bottom of the grinding housing, and the grinding inner chamber is fixedly connected to the coffee powder container.

In an embodiment, an outer part of the grinding housing is sleeved with an anti-skid sleeve, and the anti-skid sleeve is disposed with a convex block.

In an embodiment, the grinding inner chamber is disposed with an outer cutterhead and an inner cutterhead, and a second end of the central shaft is connected to the inner cutterhead through the outer cutterhead.

In an embodiment, the second end of the central shaft is disposed with a first silent ball bearing and a first bearing washer disposed between the central shaft and the first silent ball bearing; and the central shaft passes through the first bearing washer and the first silent ball bearing and then is connected to the grinding inner chamber.

In an embodiment, the second end of the central shaft includes a second silent ball bearing, a third silent ball bearing, a second bearing washer, and a spring. The second end of the central shaft is connected to the inner cutterhead through the second silent ball bearing, the third silent ball bearing, the second bearing washer, and the spring.

In an embodiment, a lower part of the inner cutterhead is disposed with a knob piece.

In an embodiment, a knob washer is arranged between the inner cutterhead and the knob piece.

Through the above technical solutions, the beneficial effects of the disclosure are as follows. The handle of the coffee grinder of the disclosure can be folded by setting the sliding slot on the top cover, which not only saves labor for grinding coffee, but also is more convenient to use. In addition, the volume of the coffee grinder of the disclosure is smaller due to the handle can be folded, which is more flexible and simpler to carry and place. It overcomes the problem of inconvenient operation caused by miniaturization design, the grinder is safe and reliable in use, and is suitable for general popularization.

BRIEF DESCRIPTION OF DRAWINGS

In order to illustrate embodiments of the disclosure or technical solutions in the related art more clearly, the following will briefly introduce the accompanying drawings used in the description of the embodiments or the related art. Apparently, the accompanying drawings in the following description are only some embodiments of the disclosure. For those skilled in the art, other drawings can be obtained according to structures shown in these accompanying drawings without paying creative labor.

Figure 1:
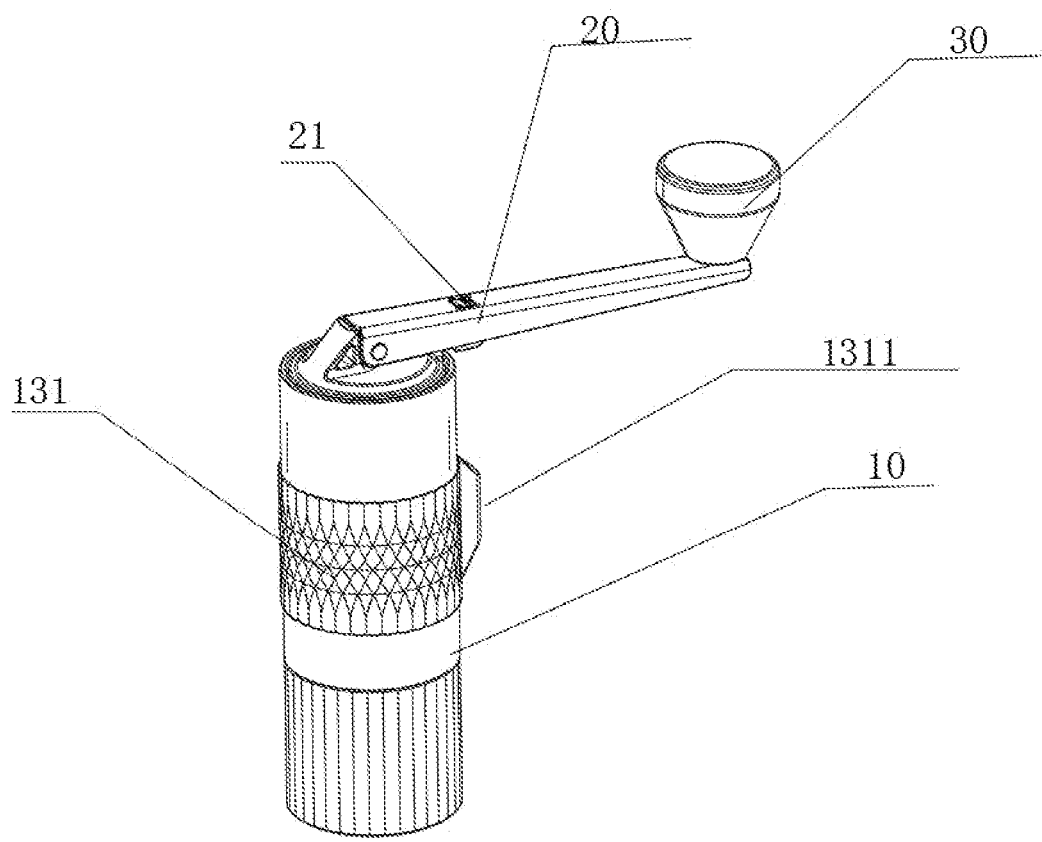
FIG. 1 is a schematic structural view of a coffee grinder with folding-type handle according to an embodiment of the disclosure.
Figure 2:
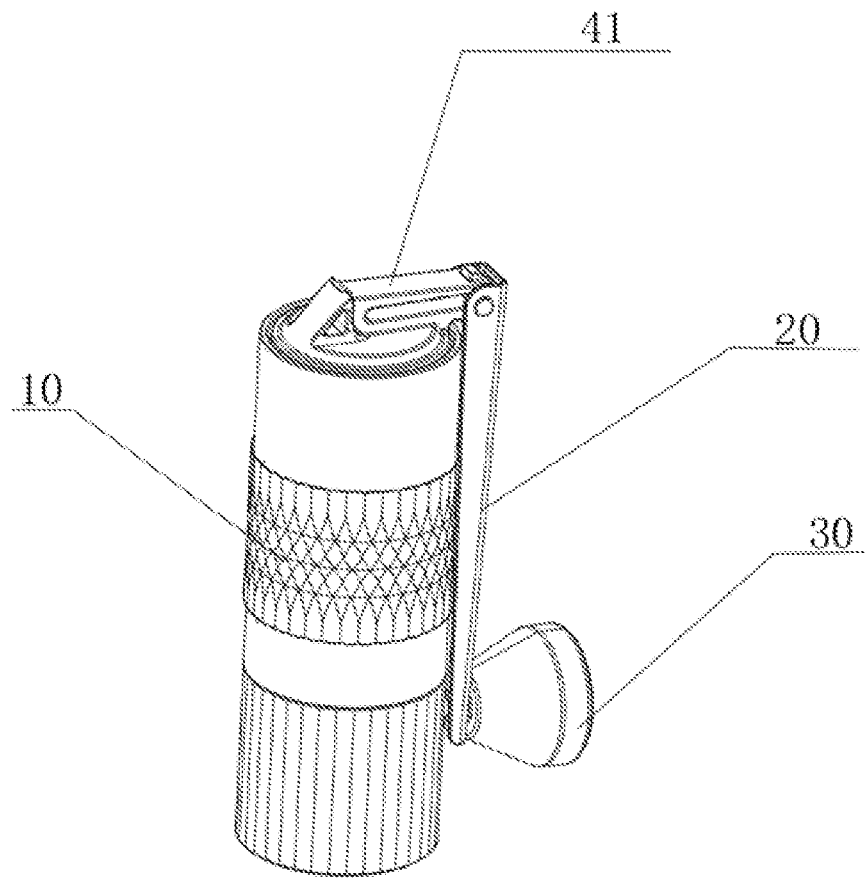
FIG. 2 is another schematic structural view of the coffee grinder with folding-type handle according to the embodiment of the disclosure.
Figure 3:
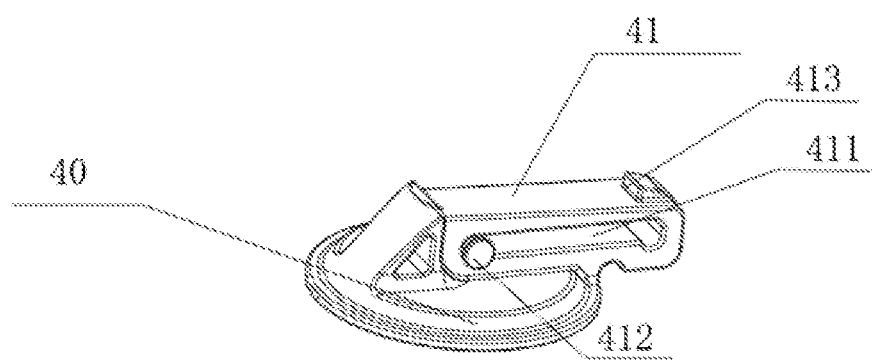
FIG. 3 is a schematic structural view of a top cover of the coffee grinder with folding-type handle according to the embodiment of the disclosure.
Figure 4:
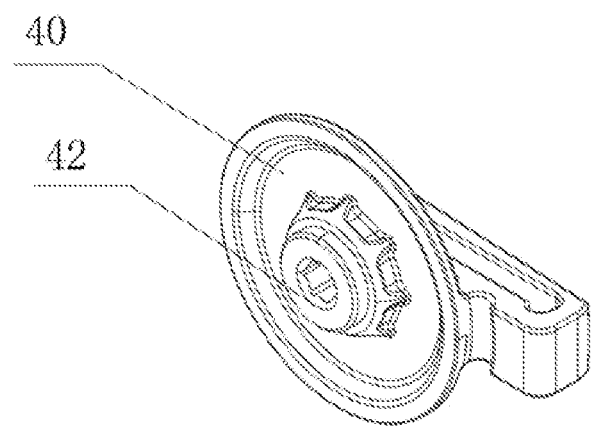
FIG. 4 is another schematic structural view of the top cover of the coffee grinder with folding-type handle according to the embodiment of the disclosure.
Figure 5:
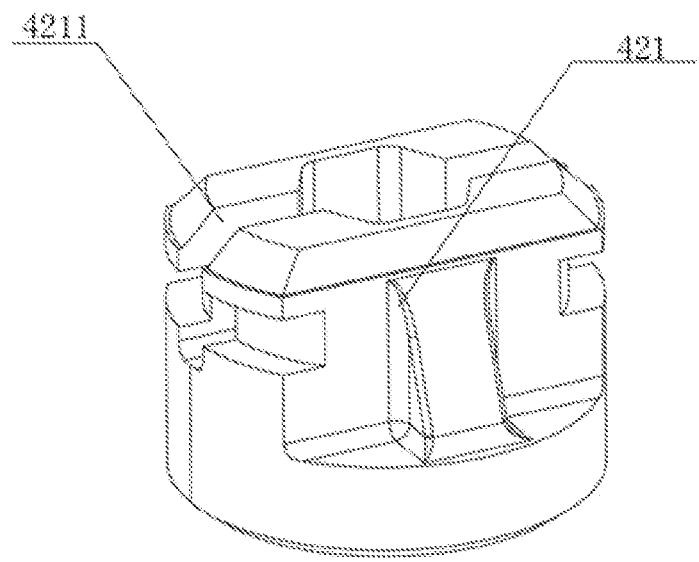
FIG. 5 is a schematic structural view of an inner hex nut of the coffee grinder with folding-type handle according to the embodiment of the disclosure.

Description of reference signs:

| Reference sign | Description | Reference sign | Description |
| --- | --- | --- | --- |
| 10 | Grinder body | 20 | Sliding bar |
| 11 | Central shaft | 21 | Through-groove |
| 111 | First bearing washer | 30 | Handle |
| 112 | First silent ball bearing | 31 | Female buckle |
| 12 | Grinding inner chamber | 32 | Rotor |
| 121 | Outer cutterhead | 33 | Rotating shaft |
| 122 | Outer cutterhead gasket | 34 | Screw hole |
| 123 | Second silent ball bearing | 35 | Screw |
| 124 | Second bearing washer | 36 | Screw silicone pad |
| 125 | Spring | 40 | Top cover |
| 13 | Grinding housing | 41 | Supporting frame |
| 131 | Anti-skid sleeve | 411 | First sliding slot |
| 14 | Inner cutterhead | 412 | Pin shaft |
| 141 | Knob washer | 413 | Protrusion |
| 142 | Knob piece | 42 | First groove |
| 15 | Coffee powder container | 421 | Inner hex nut |
| 151 | Vibration-proof cushion | 1311 | Convex block |
| 22 | Second sliding slot | 1231 | Third silent ball bearing |
| 4211 | Second groove | | |

The realization of purposes, functional features and advantages of the disclosure will be further described with reference to the accompanying drawings, in conjunction with embodiments.

DETAILED DESCRIPTION OF EMBODIMENTS

Technical solutions of embodiments of the disclosure will be clearly and completely described below in combination with the accompanying drawings in the embodiments of the disclosure. Apparently, the described embodiments only are some embodiments of the disclosure, rather than all of embodiments of the disclosure. Based on the illustrated embodiments of the disclosure, all other embodiments obtained by those skilled in the art without creative work should belong to the scope of protection of the disclosure.

It should be noted that in the illustrated embodiments of the disclosure all directional indications (such as up, down, left, right, front, rear . . . ) are only used to explain relative positional relationships and motions among components under specific postures (as shown in the accompanying drawings). When the specific postures change, the directional indications will change accordingly.

In the disclosure, unless otherwise expressly specified and limited, terms "connected", "fixed", and the like should be interpreted in a broad sense. For example, "fixed" can be a fixed connection, a detachable connection, or integrated; it can be a mechanical connection or an electrical connection; it can be directly or indirectly connected through an intermediate medium; and it can be an internal connection of two elements or interaction between two elements, unless otherwise expressly limited. For those skilled in the art, the specific meanings of the above terms in the disclosure can be understood according to specific circumstances.

In addition, in the disclosure, the descriptions such as those involving "first" and "second" are only for descriptive purposes, and cannot be construed as indicating or implying their relative importance or implicitly indicating the number/quantities of indicated technical features. Thus, the features defined with "first" and "second" may explicitly or implicitly include at least one of such features. In addition, the technical solutions of various embodiments may be combined with each other, but only on the basis that they can be realized by those skilled in the art, and when the combination of technical solutions is contradictory or unrealizable, it should be considered that such combination of the technical solutions does not exist and is not within the scope of protection of the disclosure.

The disclosure provides a coffee grinder with folding-type handle (also referred to as foldable handle coffee grinder).

Referring to FIG. 1 to FIG. 5, in an embodiment of the disclosure, the coffee grinder with folding-type handle 100 includes a grinder body 10 and a handle 30. A top of the grinder body 10 is disposed with a top cover 40, the top cover 40 is disposed with a supporting frame 41, a side of the supporting frame 41 is disposed with a first sliding slot 411. The top cover 10 is further disposed with a sliding bar 20, an end of the sliding bar 20 is connected to the first sliding slot 411 through a pin shaft 412, and the other end of the sliding bar 20 is connected to the handle 30.

Referring to FIG. 1, FIG. 2, FIG. 3, and FIG. 4, in the embodiment, an end of the supporting frame 41 on the top cover 40 is connected to the top cover 40, and the sliding bar 20 slides in the first sliding slot 411 of the supporting frame 41 through the pin shaft 412. When the sliding bar 20 slides to the other end of the supporting frame 41 along the first sliding slot 411, and the sliding bar 20 is folded to be perpendicular to the grinder body 10 through the pin shaft 412 being blocked by the first sliding slot 411.

In the embodiment, the sliding bar 20 and the handle 30 constitute a handle device, and the handle 30 can grind coffee beans by the grinder body 10 through the sliding bar 20, and the handle device of the disclosure can be folded, which is more convenient to use and carry.

Figure 6:
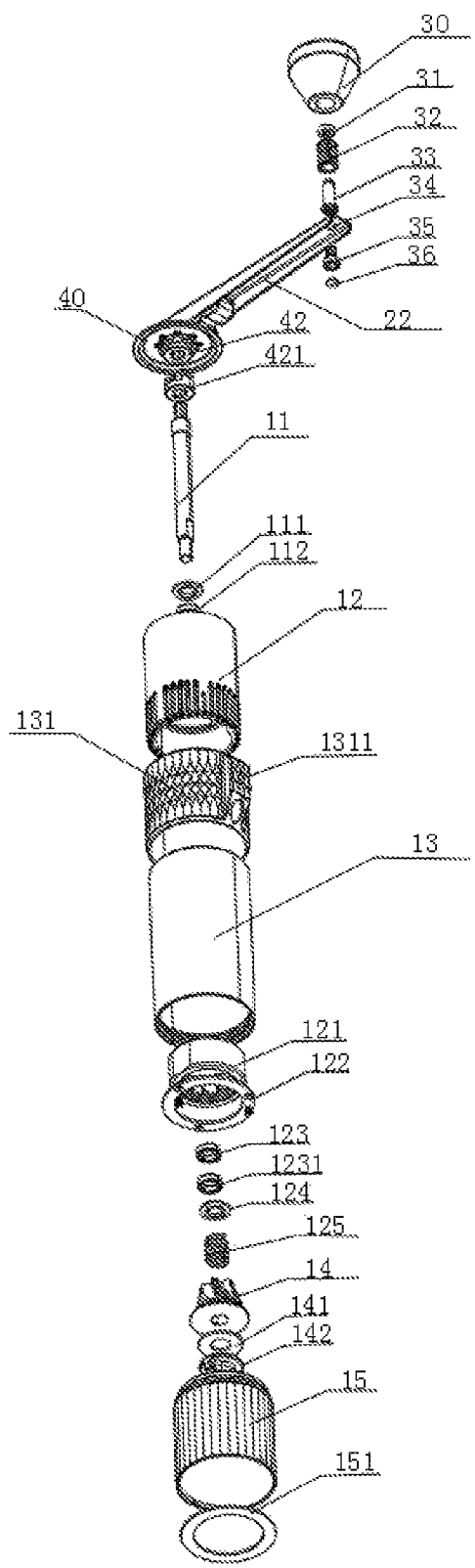
FIG. 6 is a schematic disassembled view of the coffee grinder with folding-type handle according to the embodiment of the disclosure.

Referring to FIG. 6, in the embodiment, the handle 30 may be disposed with a rotor 32 and a rotating shaft 33. In an embodiment, the rotor 32 is made of aluminum, and alternatively the rotor may be made of copper, plastic or wood. In the embodiment, the rotor 32 is an aluminum rotor. A bottom of the handle 30 is connected to a top of the rotor 32, a bottom of the rotor 32 is connected to the rotating shaft 33, and the handle 30 is connected to the other end of the sliding bar through the rotating shaft 33.

In the embodiment, the other end of the sliding bar 20 is disposed with a screw hole 34, and the handle 30 is connected to the sliding bar 20 through the rotating shaft 33. The rotating shaft 33 can be fixedly connected to the sliding bar through a screw 35 being screwed into the screw hole 34.

In the embodiment, the bottom of the handle 30 may be disposed with a female buckle 31, and the handle 30 is connected to the rotor 32 through the female buckle 31. A bottom of the screw 35 may be disposed with a screw silicone pad 36.

In the embodiment, a top end of the supporting frame 41 of the top cover may be disposed with a protrusion 413, and the sliding bar 20 includes a through-groove 21. The top end of the supporting frame 41 is the other end of the supporting frame 41. When the sliding bar 20 slides along the first sliding slot 411, the protrusion 413 can be engaged with the sliding bar 20 through the through-groove 21, making the sliding bar 20 more stable and less prone to shake when used as the handle.

Referring to FIG. 6, in the embodiment, the top cover 40 may be disposed with a first groove 42. In an embodiment, the first groove 42 is a hexagonal groove. The grinder body 10 includes a central shaft 11, an end of the central shaft 11 is connected to the top cover 40 through the first groove 42, and the other end of the central shaft 11 is connected to the grinder body 10.

In the embodiment, the first groove 42 is the hexagonal groove, and the hexagonal groove is disposed with an inner hex nut 421 (also referred to as Allen nut), and the hex nut 421 is disposed with a second groove 4211. The central shaft 11 is connected to the top cover 40 through the inner hex nut 421. In an illustrated embodiment, during a production process, the inner hex nut 421 is embedded in the top cover 40 during injection molding, the top cover 40 includes a hexagonal groove, the top cover 40 and the first groove 42 form an inner chamber, the top cover 40 is made of plastic, and the inner hex nut 421 is placed in the inner chamber. When the end of the central shaft 11 is connected to the top cover 40, the top cover 40 and the central shaft 11 play a damping role during assembly and use.

In the embodiment, the grinder body 10 includes a grinding housing 13, a grinding inner chamber 12, and a coffee powder container 15. The grinding inner chamber 12 is arranged inside the grinding housing 13, and the coffee powder container 15 is arranged at a bottom of the grinding housing 13. The grinding inner chamber 12 is fixedly connected to the coffee powder container 15 by screws screwing through the grinding housing 13. The grinding inner chamber 12 can be placed with coffee beans, and the coffee powder container 15 is used to place ground coffee powder.

In the embodiment, the other end of the central shaft 11 may be disposed with a first silent ball bearing 112. In an embodiment, a first bearing washer 111 is disposed between the central shaft 11 and the first silent ball bearing 112, and the central shaft 11 passes through the first bearing washer 111 and the first silent ball bearing 112 and then is connected to the grinding inner chamber 12.

In the embodiment, the grinding inner chamber 12 is disposed with an outer cutterhead 121 and an inner cutterhead 14, and the other end of the central shaft 11 is connected to the inner cutterhead 14 through the outer cutterhead 121.

In the embodiment, a bottom of the outer cutterhead 121 is disposed with an outer cutterhead gasket 122, and the other end of the central shaft 11 is connected to the inner cutterhead through the outer cutterhead 121 and the outer cutterhead gasket 122.

In the embodiment, the other end of the central shaft 11 is further disposed with a second silent ball bearing 123, a third silent ball bearing 123, a second bearing washer 124, and a spring 125. The other end of the central shaft 11 passes through the outer cutterhead 121 and the outer cutterhead gasket 122, and the other end of the central shaft 11 is connected to the inner cutterhead 122 through the second silent ball bearing 123, the third silent ball bearing 123, the second bearing washer 124, and the spring 125.

In the embodiment, an outer part of the grinding housing 13 is sleeved with an anti-skid sleeve 131, and the anti-skid sleeve is used to protect the grinding housing 13 and prolong the service life of the grinder.

In the embodiment, the anti-skid sleeve 131 includes a convex block 1311. In an embodiment, the sliding bar 20 includes a second sliding slot 22. When the sliding bar 20 is folded, the second sliding slot 22 is engaged with the convex block 1311, which further ensures that the sliding bar 20 is not easy to shake during folding and ensures the stability of the use of the sliding bar 20.

In the embodiment, a lower part of the inner cutterhead 14 is disposed with a knob piece 142. The knob piece 142 can adjust the grinding thickness of the coffee powder.

In the embodiment, a knob washer 141 is disposed between the inner cutterhead 14 and the knob piece 142. The knob washer 141 ensures that the knob piece 142 is used more safely.

In the embodiment, a bottom of the coffee powder container 15 is disposed with a vibration-proof cushion 151.

In the embodiment, the vibration-proof cushion 151 not only plays a cushioning effect to the coffee powder container, but also plays a protective role to the coffee powder container, further ensuring the safety of the grinder.

The disclosure has advantages of small volume, foldable handle device, convenient carrying, flexible use, and safe and reliable use when grinding coffee beans.

The above description is only illustrated embodiments of the disclosure, and is not intended to limit the scope of protection of the disclosure. Without departing from the spirit and scope of the disclosure, various changes and modifications can be made to the disclosure. Under the inventive concept of the disclosure, all equivalent structural substitutions made based on the description and accompanying drawings of the disclosure, or direct/indirect applications of the illustrated embodiments in other relevant technical fields, should be included in the scope of protection of the disclosure.

What is claimed is:

1. A coffee grinder with folding-type handle, comprising:
a grinder body and a handle;
wherein a top of the grinder body is disposed with a top cover, the top cover is disposed with a supporting frame, and a side of the supporting frame is disposed with a first sliding slot;
wherein the top cover is further disposed with a sliding bar, a first end of the sliding bar is connected to the first sliding slot through a pin shaft, and a second end of the sliding bar is connected to the handle;
wherein the handle is disposed with a rotor and a rotating shaft, a bottom of the handle is connected to a top of the rotor, a bottom of the rotor is connected to the rotating shaft, and the handle is connected to the second end of the sliding bar through the rotating shaft;
wherein a top end of the supporting frame is disposed with a protrusion, the sliding bar comprises a through-groove, and the protrusion is configured to be engaged in the through-groove; and
wherein the top cover is further disposed with a first groove, the first groove is disposed with an inner hex nut, and the inner hex nut is disposed with a second groove; the grinder body comprises a central shaft, a first end of the central shaft is connected to the top cover through the first groove.

2. The coffee grinder according to claim 1, wherein the grinder body comprises a grinding housing, a grinding inner chamber, and a coffee powder container; the grinding inner chamber is arranged inside the grinding housing, the coffee powder container is arranged at a bottom of the grinding housing, and the grinding inner chamber is fixedly connected to the coffee powder container.

3. The coffee grinder according to claim 2, wherein an outer part of the grinding housing is sleeved with an anti-skid sleeve, and the anti-skid sleeve is disposed with a convex block.

4. The coffee grinder according to claim 2, wherein the grinding inner chamber is disposed with an outer cutterhead and an inner cutterhead, and a second end of the central shaft is connected to the inner cutterhead through the outer cutterhead.

5. The coffee grinder according to claim 2, wherein a second end of the central shaft is disposed with a first silent ball bearing and a first bearing washer disposed between the central shaft and the first silent ball bearing; and the central shaft passes through the first bearing washer and the first silent ball bearing and then is connected to the grinding inner chamber.

6. The coffee grinder according to claim 4, wherein the second end of the central shaft is disposed with a second silent ball bearing, a third silent ball bearing, a second bearing washer, and a spring; and the second end of the central shaft is connected to the inner cutterhead through the second silent ball bearing, the third silent ball bearing, the second bearing washer, and the spring.

7. The coffee grinder according to claim 6, wherein a lower part of the inner cutterhead is disposed with a knob piece.

8. The coffee grinder according to claim 7, wherein a knob washer is arranged between the inner cutterhead and the knob piece.

\* \* \* \* \*